United States Patent

[11] 3,590,204

[72] Inventor Thomas J. O'Connor
100 Morgan Road, Ann Arbor, Mich.
[21] Appl. No. 729,584
[22] Filed May 16, 1968
[45] Patented June 29, 1971

[54] STRUCTURE FOR ELECTROEROSIVE MACHINING WITH ROTATING TUBULAR ELECTRODES
3 Claims, 10 Drawing Figs.

[52] U.S. Cl. ..................................... 219/69 V,
77/22, 219/69 D
[51] Int. Cl. .................................... B23p 1/08,
B23p 1/04
[50] Field of Search ........................... 219/69 R,
69 D, 69 E, 69 V, 69 F; 77/22

[56] References Cited
UNITED STATES PATENTS

| | | | |
|---|---|---|---|
| 2,730,602 | 1/1956 | Porterfield .................. | 219/69 (V) |
| 307,549 | 11/1884 | Hyatt ............................ | 77/22 |
| 916,172 | 3/1909 | Lindsay et al ................ | 77/22 UX |
| 2,377,159 | 5/1945 | Kurtz et al. ................... | 219/69 (V) X |
| 2,785,279 | 3/1957 | Williams ....................... | 219/69 (D) |
| 3,098,148 | 7/1963 | Piot et al ....................... | 219/69 (E) |

Primary Examiner—R. F. Staubly
Attorney—Whittemore, Hulbert & Belknap

ABSTRACT: Structure for and a method of electrical machining is disclosed. The structure includes electrical machining apparatus, a quick-change electrode supporting tool and means for rapidly and accurately securing the electrode-supporting tool to the electrical machining apparatus.

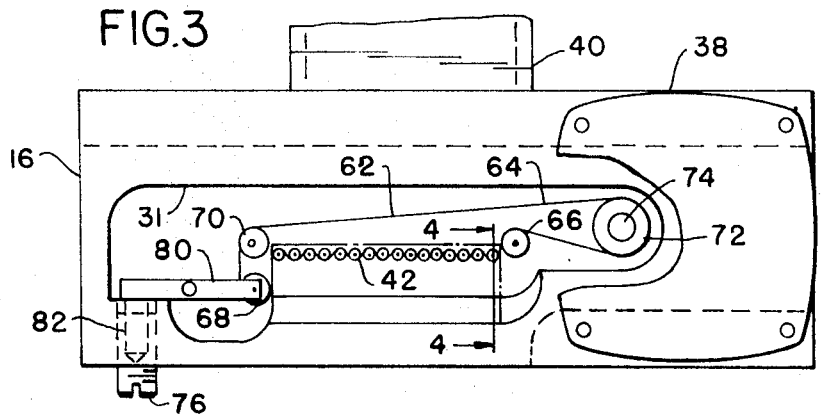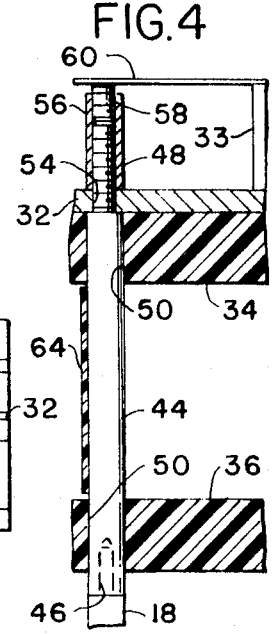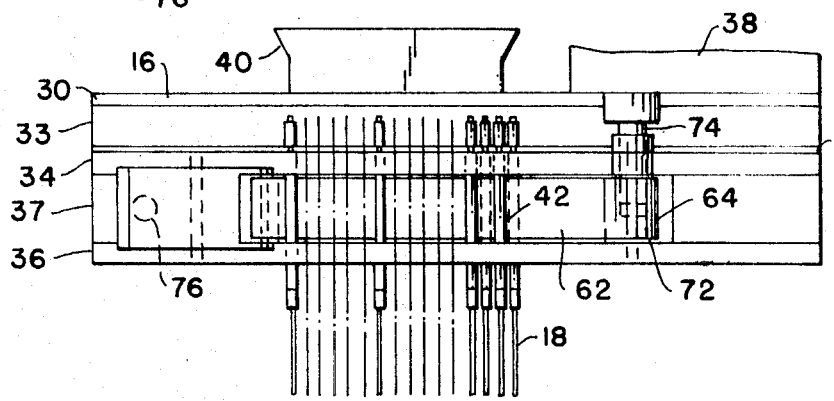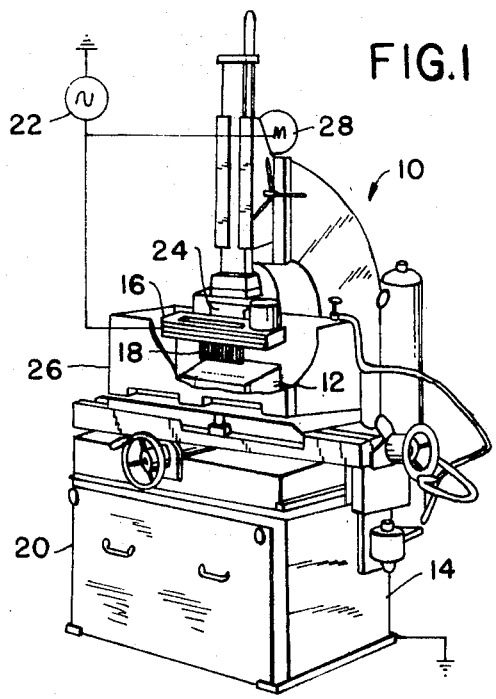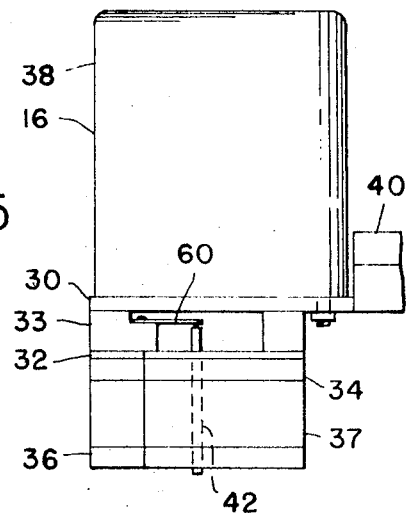

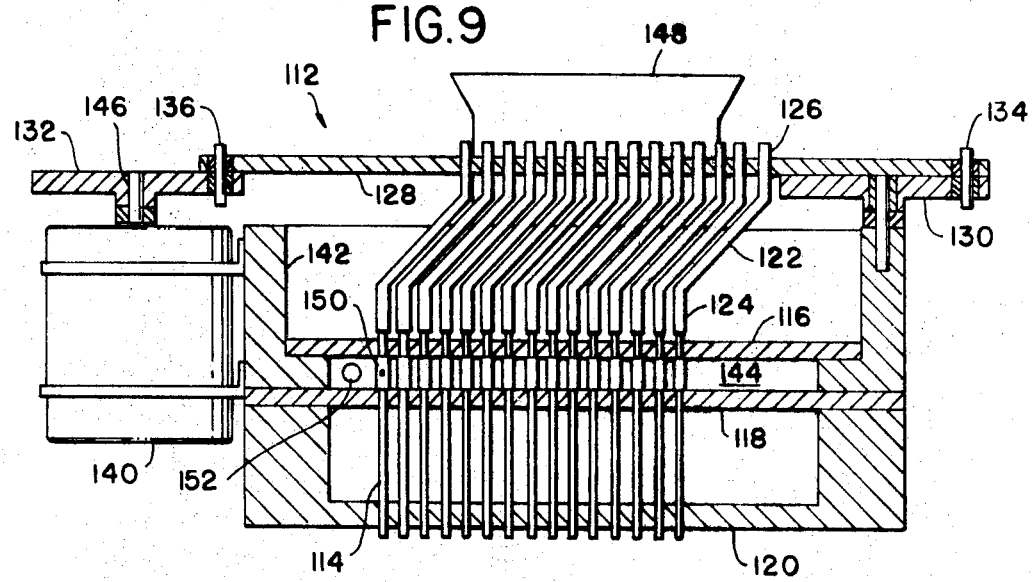
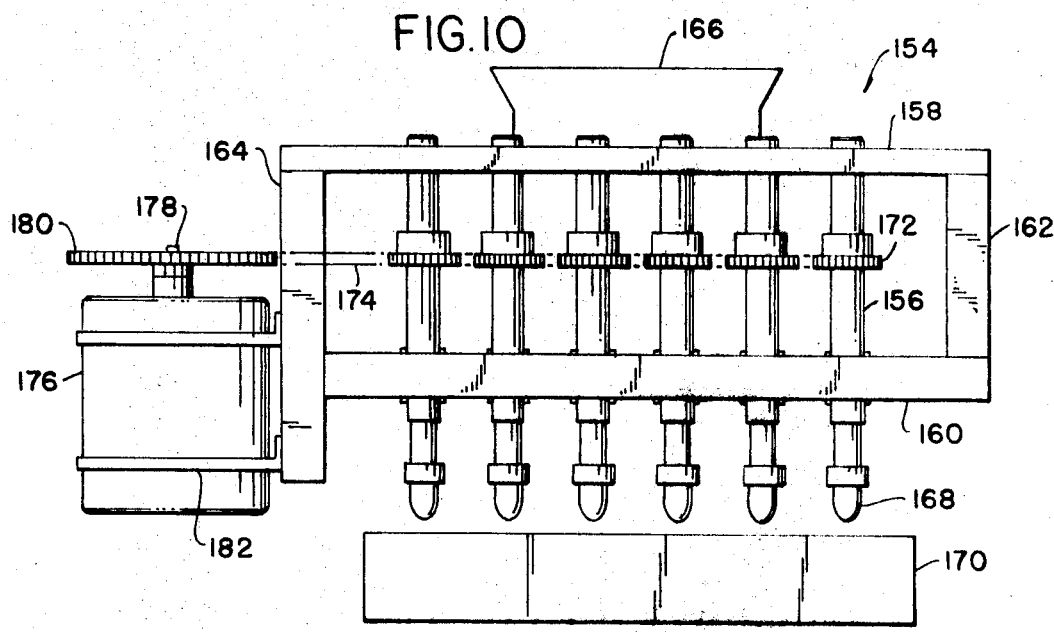

STRUCTURE FOR ELECTROEROSIVE MACHINING WITH ROTATING TUBULAR ELECTRODES

The quick-change electrode-supporting tool includes separate means for supporting a plurality of small diameter electrodes immediately adjacent each other and means for rotating the electrode-supporting means. In one modification the means for rotating the electrode-supporting means includes a driven endless ribbon engaged with opposite sides of adjacent electrode-supporting means include a worm gear portion on each of the separate electrode-supporting means and an elongated worm in simultaneous engagement with the worm gear portions, offset crank portions on the electrode-supporting means, a rotating disc and means for eccentrically connecting the rotating disc to the crank portions and chain and sprocket drive mechanisms.

The method of electrical discharge machining disclosed includes the steps of supporting a plurality of small diameter electrodes in a line and immediately adjacent each other, simultaneously rotating the electrodes, moving the electrodes together toward a workpiece and providing an electrical signal between the workpiece and electrode in the presence of a dielectric.

BACKGROUND OF THE INVENTION

1. Field of the Invention

The invention relates to structure for and a method of electrical machining and refers more specifically to a quick-change tool for supporting a plurality of linearly closely spaced, small diameter electrodes adjacent each other and simultaneously rotating the electrodes, whereby a plurality of small diameter, closely spaced openings may be machined in a workpiece in conjunction with electrical machining apparatus, and the method of use of the tool for electrical machining in conjunction with electrical machining apparatus.

2. Description of the Prior Art

In the past closely spaced linearly positioned openings in a workpiece have generally been separately machined by a mechanical drilling operation. Such operation requires a plurality of separate positioning of a drill or workpiece and are in fact impossible with many exotic metals due to the hardness thereof and the small diameters of the openings required. Wherein simultaneous drilling of such small diameter openings has in the past been attempted, the drill drive mechanisms have been particularly complicated and the operations have generally been inefficient due to misalignment of and/or breaking of the drills in use.

Similarly, in the past wherein small diameter closely spaced openings have been electrically machined in conducting workpieces, the operation has usually been accomplished by individually cutting the required openings due to the difficulty of providing rotation of a plurality of linearly positioned, closely spaced electrode-supporting structures simultaneously. Such operation again requires individual setup time to machine the adjacent openings relative to each other.

Structure for simultaneously electrically machining a plurality of small diameter openings closely spaced along a straight line while simultaneously rotating the cutting electrodes to provide improved machining in a quick-change tool attachment for electrical machining apparatus has not in the past been provided.

SUMMARY OF THE INVENTION

In accordance with the invention there is provided a quick-change tool for electrically machining a plurality of closely spaced small diameter openings which may be linearly positioned with rotating electrodes in conjunction with electrical machining apparatus.

The tool includes means for rotatably supporting a plurality of small diameter electrodes in closely spaced linear relation and a plurality of means including ribbon, worm and worm gear, eccentric crank, and chain and sprocket mechanisms for simultaneously rotating the electrode-supporting means.

BRIEF DESCRIPTION OF THE DRAWINGS

FIG. 1 is a perspective view of the structure of the invention including a quick-change tool constructed in accordance with the invention secured to electrical machining apparatus for performing the method of the invention.

FIG. 2 is an enlarged, partly broken away front elevation view of the quick-change tool illustrated in FIG. 1.

FIG. 3 is a partly broken away, top view of the quick-change tool illustrated in FIG. 1.

FIG. 4 is an enlarged, partial section view of the quick-change tool illustrated in FIG. 1, taken substantially on the line 4—4 in FIG. 3.

FIG. 5 is a partly broken away, end elevation view of the quick-change tool illustrated in FIG. 1, taken in the direction of arrow 5 in FIG. 3.

FIG. 9 is a longitudinal section view of another modification of a quick-change tool constructed in accordance with the invention.

FIG. 10 is a front elevation view of still another modification of a quick-change tool constructed in accordance with the invention.

DESCRIPTION OF THE PREFERRED EMBODIMENTS

Figure 7:
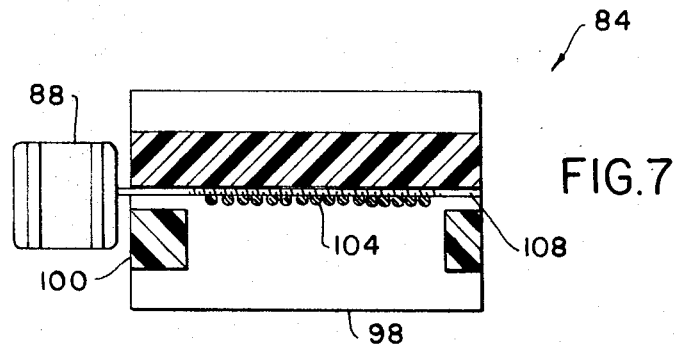
FIG. 7 is a top view of the quick-change tool illustrated in FIG. 6.

As shown in FIG. 1, the structure 10 for electrically simultaneously machining a plurality of small diameter, closely spaced linearly positioned openings in a workpiece 12 includes the electrical discharge machining apparatus 14 and the quick-change tool 16. The method of use of the structure 10 includes moving the tool 16 toward the workpiece 12 while passing an electrical signal between rotated electrodes 18 carried by the tool 16 and the workpiece 12 in the presence of a dielectric.

Electrical discharge machining apparatus 14, including the mechanical section 20, servomechanism 28 and power supply 22, are well known, as indicated in the O'Connor U.S. Pat. No. 3,222,494 and the references cited therein. They will not therefore be considered in detail herein, except to indicate the operation thereof.

In operation, the mechanical section 20 of the electrical discharge machining apparatus 14 supports quick-change tool 16 in the dovetail platen structure 24 for controlled movement toward and away from the workpiece 12 maintained in the dielectric tank 26 by the servomechanism 28. The servomechanism 28 is energized in accordance with the signal passed from the power supply 22 between the electrodes 18 and the workpiece 12 secured to the grounded mechanical section 20 of the electrical discharge machining apparatus 14.

The quick-change tool 16 is disclosed in more detail in FIGS. 2 through 5. Tool 16 includes the steel base 30 having the opening 31, the supporting plate 32 which is spaced from the base plate by spacers 33, the teflon bearing and guide plates 34 and 36 and the spacers 37 therebetween, all secured together as shown by conventional means, such as bolts (not shown). The drive motor 38 and dovetail member 40 are also secured to the base plate 30 in a conventional manner.

A plurality of separate electrode supporting means 42 are rotatably suspended from the supporting plate 32 for rotation in and guidance by the teflon plates 34 and 36. The electrode supporting means include a shaft 44 having a threaded opening 46 in the lower end thereof for receiving a threaded electrode shank and having a threaded reduced diameter 48 at the opposite end thereof. The shaft 44 passes through the guide openings 50 and 52 in the teflon plates 34 and 36, respectively, while the reduced diameter end 48 passes through the opening 54 in the supporting plate 30. A sleeve 56 is threaded over the reduced diameter end 48 of the shaft 44 and is secured in place by the locking screw 58, whereby the shaft 44 is rotatably supported by the plate 32.

Spring means 60 is provided in conjunction with the electrode-supporting means 42 for electrically connecting the electrodes 18 secured to the electrode-supporting means 42 with the power supply 22 of the electrical discharge machining apparatus 14, as will be understood by those in the art.

The drive means 62 for the electrode-supporting means 42, illustrated best in FIGS. 2 and 3, includes the ribbon 64 which may be a typewriter ribbon threaded over the guide rollers 66, 68 and 70 and alternately under and over adjacent electrode-supporting means 42, so as to be in driving engagement with the opposite sides of the adjacent electrode-supporting means. The ribbon 64 is further passed around the friction drive member 72 which in turn is secured to the motor shaft 74 for rotation therewith on energizing the motor 38.

The tension on the ribbon 64 may be adjusted by means of the adjusting screw 76 threaded through the spacer 37 between the neoprene plates 34 and 36. The ribbon guide 68 mounted on the member 80 may therefore be adjusted to provide desired tension in the ribbon 64 through threaded engagement of the shank 82 secured thereto with the adjusting screw 76.

In overall operation, as the quick-change tool 16 is moved toward the workpiece 12, the electrodes 18 are rotated by means of the motor 38 which may be energized from any convenient source of electricity to drive the typewriter ribbon 64. The openings produced by the quick-change tool 16 are geometrically correct due to the rotation of the electrodes and may be extremely close together, as for example on ¼ inch centers linearly, even though of very small diameter, as for example one thirty-second of an inch, without causing breakage of the electrodes or without requiring complicated or particularly strong driving mechanisms to rotate the electrodes, since no physical contact of the electrodes 18 is required with the usual high tolerance electrical machining, such as in electrical discharge machining and electrochemical machining.

Figure 6:
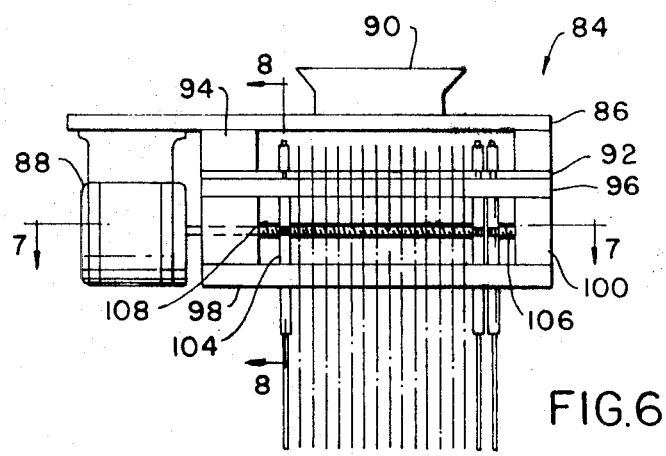
FIG. 6 is a front elevation view of a modification of the quick-change tool illustrated in FIG. 1.
Figure 8:
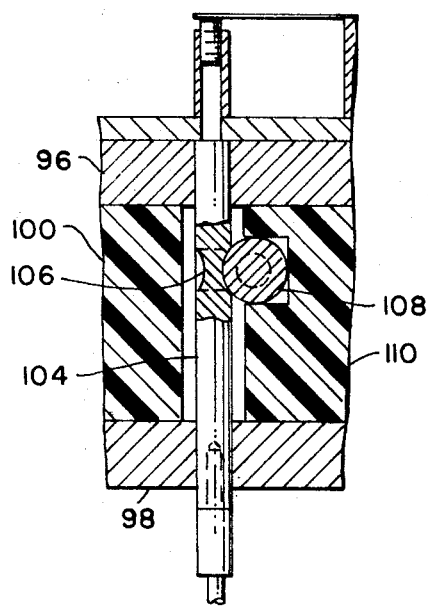
FIG. 8 is an enlarged, partial cross section view of the modified quick-change tool illustrated in FIG. 6 taken substantially on the line 8—8 in FIG. 7.

The modified quick-change tool 84 illustrated in FIGS. 6, 7 and 8 again permits simultaneous rotation of electrodes of very small diameter, such as one thirty-second of an inch, linearly spaced adjacent each other at intervals of, for example, one quarter inch, with particularly simple, uncomplicated mechanism. As shown best in FIG. 6, the quick-change tool 84 includes a base plate 86 to which the motor 88 and dovetail mounting member 90 are secured. The steel supporting plate 92 is supported from the base plate 86 and spaced therefrom by the spacing blocks 94 and the neoprene plates 96 and 98 are secured together and spaced apart by spacers 100 at the opposite ends thereof, as shown best in FIG. 6. plates 86 and 92 and Plates 94 and plates 96 and 98 and spacers 100 are secured together as shown by convenient means, such as adhesives, bolts or the like.

The electrode-supporting means 104 are rotatably mounted on the plate 92 in linear alignment as before for rotation in and guidance by the neoprene plates 96 and 98. Each of the electrode supporting means 104 is in the modified quick-change tool 84 provided with a central worm gear portion 106, shown best in FIG. 8, which is engaged with the elongated worm 108 rotatably supported in the spacers 100 and engaged with the worm gear portions of the electrode-supporting means 104.

The modified quick-change tool 112, shown in FIG. 9, includes the electrode-supporting means 114 secured for rotation between the plates 116 and 118 and guided by the guide member 120 secured to the plate 118 at the opposite ends thereof, as shown. The electrode-supporting means 114 are linearly positioned to provide closely spaced small diameter holes with an electrode secured thereto. Crank portions 122 on the upper end of electrode-supporting means 114 have offset ends 124 and 126. The upper offset ends 126 are passed through openings in the drive plate 128 for rotation therein on movement of the drive plate 128 which is eccentrically secured to the rotatable discs 130 and 132 by pivot structure 134 and 136, respectively.

The motor 140 is secured to the body 132 of the quick-change tool 112. Body portion 142 of tool 112 provides spacing between the plates 116 and 118 to produce the dielectric chamber 144 which will be considered subsequently. Motor 140 drives disc 132 through the rotatable shaft 146. A dovetail portion 148 is secured to the body portion 142 by convenient means, such as for example welding.

The electrode-supporting means 114 of the modified quick-change tool 112 are hollow and receive hollow electrodes in the lower ends thereof. A seal (not shown) is provided about each electrode-supporting means 114 where it passes through the plates 116 and 118 and an opening 150 extends transversely of the electrode-supporting means 114. Thus, in operation, with dielectric passed into the chamber 144 through, for example, a coupling 152 in the body 142, dielectric is passed through the openings 150 through the electrode-supporting means 114 and the hollow electrodes to maintain dielectric fluid between the electrodes and a workpiece.

In operation, as the quick-change tool 112 is advanced toward a workpiece by the electrical machining apparatus, the motor 140 is energized by a convenient source of electric energy to rotate the disc 132 which in turn will move the plate 128 to rotate the disc 130 and the electrode-supporting means 114. The electrode-supporting means 114 will then, as before, rotate electrodes secured thereto to provide closely spaced, small diameter, linearly positioned, openings with particularly simple, efficient structure. Simultaneously the dielectric fluid passed into the dielectric chamber 144 through the fitting 152 will pass through the openings 150 in the hollow electrode-supporting means 114 and subsequently through hollow electrodes supported thereby to maintain dielectric between the electrodes and a workpiece.

In the modification 154 of the quick-change tool illustrated in FIG. 10, the electrode-supporting structures 156 are supported for rotation between the plates 158 and 160 which are separated by spacers 162 and 164. The dovetail mounting portion 166 is conveniently secured to the plate 158 and electrodes 168 are secured to the electrode-supporting means 156 for movement toward and away from the workpiece 170.

The electrode-supporting structures 156 are again closely spaced in linear arrangement and include sprocket means 172 secured thereto. The sprocket means 172 are each engaged with a chain drive 174 which is driven through motor 176, drive shaft 178 and sprocket 180. The motor 176 is secured to the spacer 164 by brackets 182, as required.

Again with the tool structure 154, a plurality of small diameter, linearly positioned, closely spaced openings may be electrically machined on movement of the tool 154 toward the workpiece 170 and the structure for rotating the electrodes is particularly simple, economical and efficient.

While one embodiment and modifications of the present invention have been considered in detail, it will be understood that other embodiments and modifications are contemplated. It is the invention to include all embodiments and modifications as are defined by the appended claims within the scope of the invention.

What I claim as my invention is:

1. A quick-change tool for electrical machining comprising a base, means for supporting the base for movement toward and away from a workpiece, rotatable means secured to the base for supporting a plurality of parallel small diameter electrodes immediately adjacent each other for rotation including a separate electrode holder for each electrode, motor means secured to the base and means operable between the motor means and means for supporting the electrodes for simultaneously rotating the means for supporting the electrodes in the presence of a dielectric on energization of the motor means including a rotatable disc secured to the motor for rotation about an axis parallel to the axis of rotation of the means for supporting the electrodes, a rotatable disc secured to the base of the quick-change tool for rotation about a separate axis parallel to the axis of the means for supporting the electrodes, a separate crank member connected to each electrode holder including parallel portions at the opposite ends thereof parallel to the electrode holders and a single offset portion extending diagonally between the parallel ends thereof, one of the ends being connected to an associated electrode holder in axial alignment therewith and a plate having a plurality of openings therein for receiving the other ends of the separate crank members and eccentrically pivotally connected to the rotatably mounted discs at the opposite ends thereof whereby on energizing the motor to rotate the one disc connected thereto the plate is caused to rotate in a parallel manner so that said other ends of the crank members describe circles having centers on the longitudinal axis of the associated electrodes so that on movement of the tool toward a workpiece with electrodes positioned in the means for supporting the electrodes in the presence of a dielectric with opposite terminals of a power source connected to the electrodes and the workpiece electrical machining of a plurality of closely spaced parallel small openings may be accomplished in the workpiece.

2. Structure as set forth in claim 1 wherein the separate electrode holders are hollow and the base further includes a pair of plates extending transversely thereacross defining a fluid chamber therewith and having a plurality of aligned parallel openings therethrough for rotatably receiving portions of the electrode holders within the chamber and openings extending radially through the electrode holder portions within the chamber whereby dielectric fluid within the chamber will pass through the hollow electrode-holding means and out of hollow electrodes secured therein.

3. A quick-change tool for electrical discharge machining comprising a body portion which is a generally rectangular hollow member having an inwardly extending flange at the bottom thereof, a pair of plates secured to the body portion on opposite sides of the inwardly extending flange defining a dielectric chamber therebetween, an opening extending into the chamber for feeding dielectric fluid thereinto, a guide portion secured to the bottom of the quick-change tool adjacent the chamber therein, a plurality of aligned closely spaced small openings in the guide portion and plates of the quick-change tool, hollow electrode holders secured in the openings for rotation therein, an opening extending radially through the electrode holders within the chamber of the quick-change tool for passing dielectric fluid in the chamber into the electrode holders and out of hollow electrodes positioned therein, a separate crank portion secured to each electrode holder, each having a pair of parallel ends one of which is secured to the associated electrode holder axially thereof and a single transverse portion extending between the parallel ends thereof, a motor having a rotary output shaft extending parallel to the electrode holders, a first disc secured to the motor shaft for rotation therewith, a second disc positioned on the body portion of the tool for rotation thereon, a third plate having a plurality of openings therethrough receiving the other ends of the crank portions of the quick-change tool and means connecting the opposite ends of the third plate pivotally to the separate discs eccentrically with respect to the axis of rotation thereof by the amount of the offset of the crank members whereby on energizing of the motor the one disc is caused to rotate to move the third plate so as to rotate the other ends of the crank members in circles having as centers of rotation the longitudinal axis of the electrode holder associated therewith whereby the electrode holders are simultaneously rotated.